United States Patent
Kouno et al.

(10) Patent No.: US 11,211,890 B2
(45) Date of Patent: Dec. 28, 2021

(54) POWER CONVERSION APPARATUS AND AIR-CONDITIONING APPARATUS

(71) Applicant: DAIKIN INDUSTRIES, LTD., Osaka (JP)

(72) Inventors: Masaki Kouno, Osaka (JP); Hirotaka Doi, Osaka (JP); Yukihide Yamane, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/759,513

(22) PCT Filed: Oct. 30, 2018

(86) PCT No.: PCT/JP2018/040366
§ 371 (c)(1),
(2) Date: Apr. 27, 2020

(87) PCT Pub. No.: WO2019/088118
PCT Pub. Date: May 9, 2019

(65) Prior Publication Data
US 2020/0304051 A1    Sep. 24, 2020

(30) Foreign Application Priority Data
Nov. 6, 2017 (JP) .............................. JP2017-214228

(51) Int. Cl.
*H02P 27/06* (2006.01)
*H02M 5/458* (2006.01)

(52) U.S. Cl.
CPC ............ *H02P 27/06* (2013.01); *H02M 5/458* (2013.01)

(58) Field of Classification Search
CPC ........ H02M 5/458; H02P 27/06; H02P 27/04; H02P 1/00; H02P 1/04; H02P 1/46;
(Continued)

(56) References Cited

U.S. PATENT DOCUMENTS 6,265,786 B1 * 7/2001 Bosley .................... H02P 9/04
290/52
9,981,274 B2 * 5/2018 Inaniwa .................. B04B 9/02
(Continued)

FOREIGN PATENT DOCUMENTS

EP    1 557 935 A1    7/2005
JP    56-49693 A      5/1981
(Continued)

OTHER PUBLICATIONS

Hinkkanen et al., "Induction Motor Drives Equipped With Diode Rectifier and Small DC-Link Capacitance," IEEE Transactions on Industrial Electronics, vol. 55, No. 1, Jan. 2008, pp. 1498-1503, 6 pages total.

(Continued)

*Primary Examiner* — Antony M Paul
(74) *Attorney, Agent, or Firm* — Birch, Stewart, Kolasch & Birch, LLP

(57) ABSTRACT

A power conversion apparatus includes a rectifier circuit, an inverse conversion circuit, and a capacitor. The rectifier circuit rectifies alternating current power of the alternating current power supply. The inverse conversion circuit inversely converts a voltage Vdc rectified by the rectifier circuit into an alternating current voltage having a certain frequency and applies the alternating current voltage to a motor whose maximum power consumption Pmax is 2 kW or larger. The capacitor is provided between the rectifier circuit and the inverse conversion circuit and has a capacitance C that satisfies a condition of a following expression in relation to an alternating current voltage Vac of the alternating current power supply and the maximum power consumption Pmax.

(Continued)

$$C \leq 350 \times 10^{-6} \frac{P\max}{Vac^2}. \quad (1)$$

20 Claims, 8 Drawing Sheets

(58) Field of Classification Search
CPC ...... H02P 3/00; H02P 3/12; H02P 6/00; H02P 6/08; H02P 6/10; H02P 21/00; H02P 23/00; H02P 25/00; H02P 27/00
See application file for complete search history.

(56) References Cited

U.S. PATENT DOCUMENTS

| | | | |
|---|---|---|---|
| 10,171,022 B2 * | 1/2019 | Kim | H02P 23/26 |
| 10,187,001 B2 * | 1/2019 | Tanabe | G05B 23/0237 |
| 10,495,340 B2 * | 12/2019 | Shimura | H02M 1/143 |
| 2006/0208687 A1 | 9/2006 | Takeoka et al. | |
| 2009/0213513 A1 | 8/2009 | Baudesson | |
| 2012/0113693 A1 | 5/2012 | Sekimoto et al. | |
| 2013/0063988 A1 * | 3/2013 | Alexander | H02M 7/4807 363/37 |

FOREIGN PATENT DOCUMENTS

| | | | |
|---|---|---|---|
| JP | 2005-198377 A | 7/2005 | |
| JP | 2005-210861 A | 8/2005 | |
| JP | 2007-202378 A | 8/2007 | |
| JP | 2011-24321 A | 2/2011 | |
| JP | 2012-157242 A | 8/2012 | |
| JP | 2012157242 A * | 8/2012 | ............. H02P 27/06 |
| JP | 2014-036479 A | 2/2014 | |
| JP | 2014-140272 A | 7/2014 | |
| JP | 2015-111999 A | 6/2015 | |
| KR | 10-2014-0109165 A | 9/2014 | |

OTHER PUBLICATIONS

International Search Report (PCT/ISA/210) issued in PCT/JP2016/040366, dated Jan. 22, 2019.
Extended European Search Report dated Jun. 28, 2021 in corresponding European Patent No. 18872512.1.

* cited by examiner

POWER CONVERSION APPARATUS AND AIR-CONDITIONING APPARATUS

TECHNICAL FIELD

The present disclosure relates to a power conversion apparatus and an air conditioning apparatus.

BACKGROUND ART

During recent years, the configuration of smoothing capacitors in power conversion apparatuses has been examined. PTL 1 (Japanese Unexamined Patent Application Publication No. 56-49693), for example, discloses a frequency conversion apparatus (power conversion apparatus) including a filter for smoothing direct current voltage.

SUMMARY OF THE INVENTION

Technical Problem

In PTL 1 (Japanese Unexamined Patent Application Publication No. 56-49693), however, the capacitance of a capacitor included in a filter is not specifically examined. Here, if a high-capacitance smoothing capacitor is used for a power conversion apparatus, the power conversion apparatus is increased in size.

The present disclosure relates to a power conversion apparatus capable of achieving reduction in size.

Solution to Problem

A power conversion apparatus in the present disclosure includes a rectifier circuit, an inverse conversion circuit, and a capacitor. The rectifier circuit rectifies alternating current power of a three-phase alternating current power supply. The inverse conversion circuit inversely converts a voltage rectified by the rectifier circuit into an alternating current voltage having a certain frequency and applies the alternating current voltage to a motor whose maximum power consumption Pmax ([W]) is 2 kW or larger. The capacitor is provided between the rectifier circuit and the inverse conversion circuit and has a capacitance C ([F]) that satisfies a condition of a following expression (1) in relation to an alternating current voltage Vac ([V]) of the three-phase alternating current power supply and the maximum power consumption Pmax ([W]). This configuration reduces fifth and seventh harmonics.

$$C \leq 350 \times 10^{-6} \frac{Pmax}{Vac^2} \quad (1)$$

In addition, in the power conversion apparatus in the present disclosure, the capacitor may have a capacitance C ([F]) that satisfies a condition of a following expression (2). In this case, a power conversion apparatus that offers a desirable overall cost balance can be provided.

$$100 \times 10^{-6} \frac{Pmax}{Vac^2} \leq C \quad (2)$$

In addition, in the power conversion apparatus in the present disclosure, the capacitance of the capacitor is equal to or lower than 200 μF. The capacitor, therefore, can be reduced in size.

In addition, in the power conversion apparatus in the present disclosure, the capacitor is a capacitor other than an electrolytic capacitor. For example, the capacitor is a film capacitor. By using such a capacitor, the power conversion apparatus achieves long lifetime and high reliability.

In addition, in the power conversion apparatus in the present disclosure, a relay need not be provided between the three-phase alternating current power supply and the capacitor. As a result, the power conversion apparatus can be reduced in size. The power conversion apparatus in the present disclosure, however, does not exclude a case where a relay is provided between the three-phase alternating current power supply and the capacitor.

In addition, the power conversion apparatus in the present disclosure supplies power to a motor mounted on a compressor of an air conditioning apparatus. The compressor of the air conditioning apparatus, therefore, can be improved in terms of reliability and reduced in size, weight, and cost.

In addition, one of the above power conversion apparatuses is mounted on an air conditioning apparatus in the present disclosure. An air conditioning apparatus whose reliability is high and capable of achieving reduction in size, weight, and cost, therefore, can be provided.

DESCRIPTION OF EMBODIMENTS

Embodiments of a power conversion apparatus and an air conditioning apparatus according to the present disclosure will be described hereinafter on the basis of the drawings.

Figure 1:
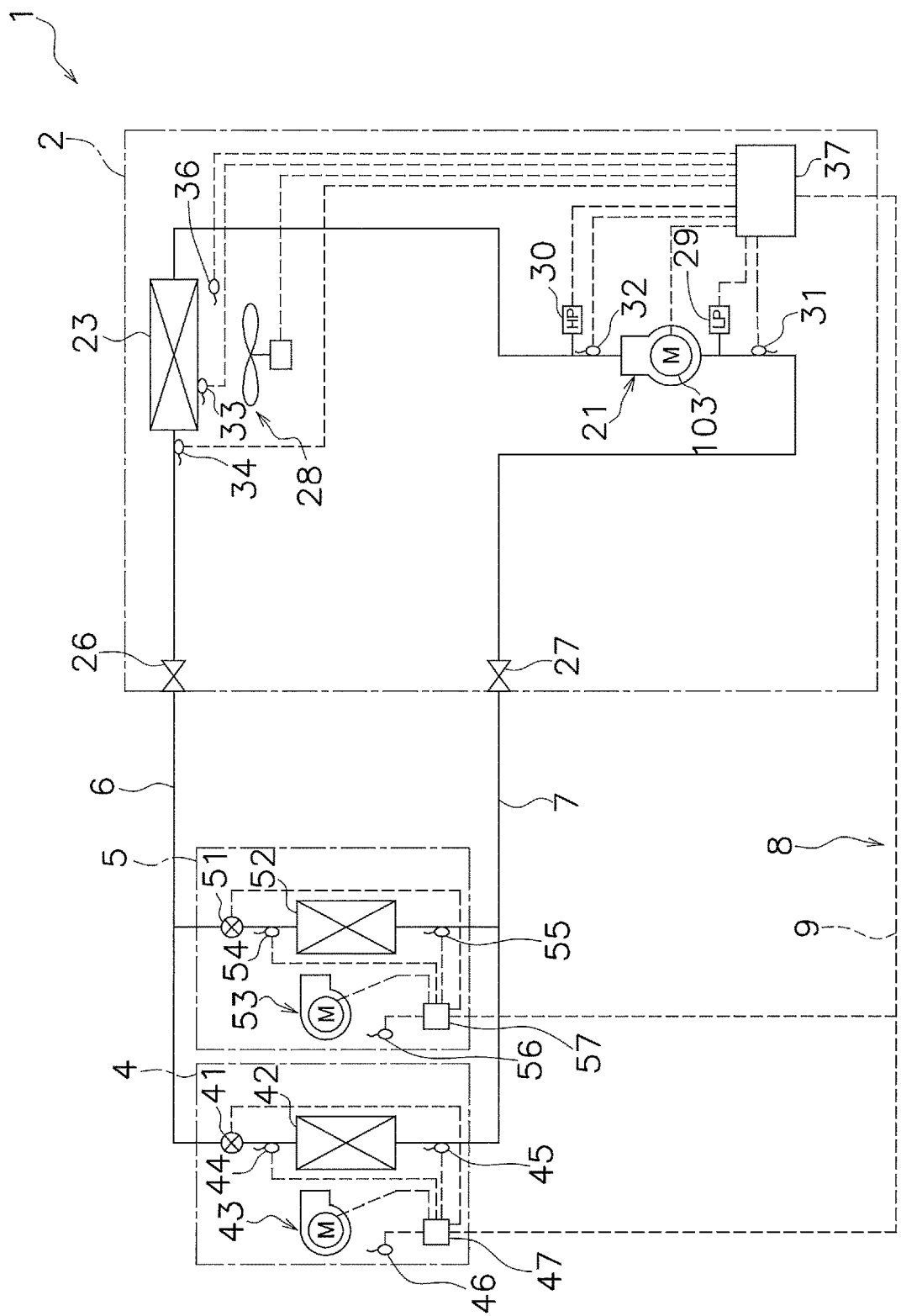
FIG. 1 is a schematic diagram illustrating the configuration of an air conditioning apparatus 1 according to a first embodiment.

First Embodiment (1) Air Conditioning Apparatus
(1-1) Configuration of Air Conditioning Apparatus FIG. 1 is a schematic configuration diagram illustrating an air conditioning apparatus 1 according to a first embodiment. The air conditioning apparatus 1 is an apparatus used to condition air in a room of a building or the like by performing a vapor-compression refrigeration cycle operation. The air conditioning apparatus 1 includes an outdoor unit 2, which is a heat source unit, indoor units 4 and 5, which are a plurality of (two in the present embodiment) use units connected in parallel with the outdoor unit 2, and a liquid-refrigerant connection pipe 6 and a gas-refrigerant connection pipe 7, which are refrigerant connection pipes that connect the outdoor unit 2 and the indoor units 4 and 5 to each other.

Here, the air conditioning apparatus 1 is configured to perform only a cooling operation and does not have a heating operation function. The outdoor unit 2, therefore, does not include a four-way switching valve and an accumulator. In addition, an expansion mechanism on a side of the outdoor unit is not included.

The indoor unit 4 and the indoor unit 5 have the same configuration. In the following description, numerals in the fifties are given to components of the indoor unit 5 instead of numerals in the forties, which indicate components of the indoor unit 4.

The outdoor unit 2 is installed outside a building or the like and connected to the indoor units 4 and 5 through the liquid-refrigerant connection pipe 6 and the gas-refrigerant connection pipe 7. The outdoor unit 2 mainly includes a compressor 21, an outdoor heat exchanger 23 as a heat source-side heat exchanger, a liquid-side shutoff valve 26, a gas-side shutoff valve 27, an outdoor fan 28, and an outdoor-side control unit 37.

The compressor 21 is a compressor capable of varying operating capacity. Here, the compressor 21 is driven by a motor 103, whose number of revolutions Rm is controlled by a motor driving apparatus (power conversion apparatus 105), which will be described later. The outdoor unit 2 includes various sensors such as a suction pressure sensor 29, a discharge pressure sensor 30, a suction temperature sensor 31, a discharge temperature sensor 32, a heat exchanger temperature sensor 33, a liquid-side temperature sensor 34, and an outdoor temperature sensor 36. The discharge pressure sensor 30 detects discharge pressure of the compressor 21.

The outdoor-side control unit 37 includes a microcomputer and a memory. A motor driving device that controls the motor 103 is incorporated into the outdoor-side control unit 37.

The indoor unit 4 includes an indoor expansion valve 41 as an expansion mechanism, an indoor heat exchanger 42 as a use-side heat exchanger, an indoor fan 43, and an indoor-side control unit 47. The indoor unit 4 also includes various sensors such as temperature sensors 44 and 45 that detect the temperature of a refrigerant and an indoor temperature sensor 46. The indoor-side control unit 47 includes a microcomputer, a memory, and the like and is capable of individually operating the indoor unit 4. In addition, the indoor unit 4 communicates control signals and the like with a remote control (not illustrated) and control signals and the like with the outdoor unit 2 through a transmission line 9. Here, the outdoor-side control unit 37 and the indoor-side control unit 47 are connected to each other through the transmission line 9 and together constitute a control unit 8 that controls the operation of the air conditioning apparatus 1.

(1-2) Operation of Air Conditioning Apparatus (Cooling Operation)

Next, the operation of the air conditioning apparatus 1 according to the present embodiment will be described. The air conditioning apparatus 1 according to the present embodiment is a cooling-only apparatus and performs the cooling operation.

In the cooling operation, each indoor heat exchanger 42 functions as an evaporator and decreases indoor air temperature. More specifically, in the cooling operation, a discharge side of the compressor 21 is connected to a gas side of the outdoor heat exchanger 23 and a suction side of the compressor 21 is connected to a gas side of the indoor heat exchanger 42 through the gas-side shutoff valve 27 and the gas-refrigerant connection pipe 7. In addition, in the cooling operation, the liquid-side shutoff valve 26 and the gas-side shutoff valve 27 are controlled in such a way as to be in an open state. An opening degree of each indoor expansion valve 41 is adjusted such that a degree of superheating of the refrigerant at an outlet of the indoor heat exchanger 42 (i.e., the gas side of the indoor heat exchanger 42) remains constant at a target value of the degree of superheating.

If the compressor 21, the outdoor fan 28, and the indoor fan 43 are activated with a refrigerant circuit in this state, a low-pressure gas refrigerant is sucked into the compressor 21, compressed, and turns into a high-pressure gas refrigerant. The high-pressure gas refrigerant is transferred to the outdoor heat exchanger 23, exchanges heat with outdoor air supplied by the outdoor fan 28, and turns into a high-pressure liquid refrigerant.

The high-pressure liquid refrigerant is transferred to the indoor unit 4 via the liquid-side shutoff valve 26 and the liquid-refrigerant connection pipe 6. The high-pressure liquid refrigerant transferred to the indoor unit 4 is decompressed by the indoor expansion valve 41 to near a suction pressure of the compressor 21 and transferred to the indoor heat exchanger 42 as a low-pressure refrigerant in a gas-liquid two-phase state. In the indoor heat exchanger 42, the refrigerant in the gas-liquid two-phase state exchanges heat with indoor air, evaporates, and turns into a low-pressure gas refrigerant. At this time, the temperature of the indoor air decreases. The low-pressure gas refrigerant is transferred to the outdoor unit 2 via the gas-refrigerant connection pipe 7 and sucked into the compressor 21 again.

(2) Motor Driving Apparatus

The motor driving apparatus according to the present embodiment includes a power conversion apparatus 105 and drives the motor 103 mounted on the above-described compressor 21 of the above-described air conditioning apparatus 1.

Figure 2:
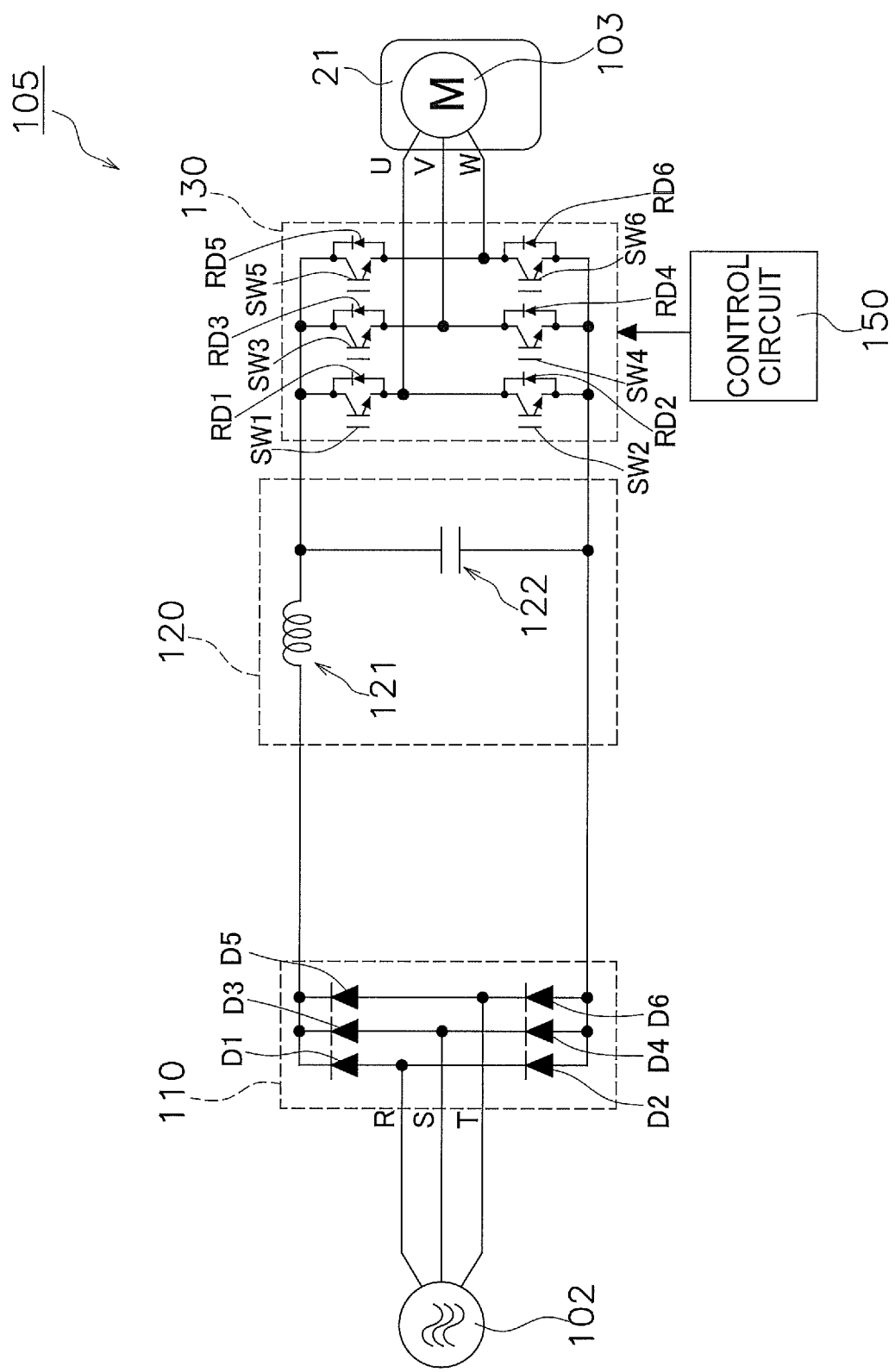
FIG. 2 is a schematic diagram illustrating the configuration of a power conversion apparatus 105 according to the first embodiment.

As illustrated in FIG. 2, the power conversion apparatus 105 includes a rectifier circuit 110, a direct-current link unit 120, an inverse conversion circuit 130, and a control circuit 150. The power conversion apparatus 105 converts a frequency of power supplied from an alternating current power supply 102 into a certain frequency and applies the power to the motor 103. Here, the motor 103 is a three-phase alternating current motor, and maximum power consumption Pmax ([W]) of the motor 103 is 2 kW or larger. The motor 103 is used, for example, to drive the compressor 21 provided in the refrigerant circuit of the air conditioning apparatus 1.

In addition, the power conversion apparatus 105 makes a current limiting circuit between the alternating current power supply 102 and a capacitor 122 unnecessary, details of which will be described later. In addition, the power conversion apparatus 105 can be mounted on a printed board. The printed board is connected to the alternating current power supply 102 through a harness.

The alternating current power supply 102 supplies power to the power conversion apparatus 105 and the motor 103 through the harness or the like. More specifically, the alternating current power supply 102 is a so-called commercial three-phase alternating current power supply and supplies alternating current voltage Vac ([V]) having a frequency of 50 Hz, 60 Hz, or the like.

The rectifier circuit 110 is connected to the alternating current power supply 102 and converts the alternating current voltage Vac ([V]) output from the alternating current power supply 102 into a direct current voltage Vdc ([V]) by performing full-wave rectification on the alternating current voltage Vac ([V]). More specifically, the rectifier circuit 110 includes a diode bridge circuit in which six diodes D1 to D6 are connected to one another as a bridge. The diodes D1 and D2, the diodes D3 and D4, and the diodes D5 and D6 are connected in series with each other. A node between the diodes D1 and D2 is connected to an output of an R phase of the alternating current power supply 102. A node between the diodes D3 and D4 is connected to an output of an S phase of the alternating current power supply 102. A node between the diodes D5 and D6 is connected to an output of a T phase of the alternating current power supply 102. The rectifier circuit 110 rectifies the alternating current voltage Vac output from the alternating current power supply 102 and outputs the rectified alternating current voltage Vac to the direct-current link unit 120. Here, a ratio of a maximum rated current square time product to a maximum rated output current of the diodes D1 to D6 of the rectifier circuit 110 is αm ([A·s]).

The direct-current link unit 120 is provided between the rectifier circuit 110 and the inverse conversion circuit 130 and includes at least the capacitor 122. Here, the direct-current link unit 120 includes a reactor 121 and the capacitor 122.

The reactor 121 is provided between the rectifier circuit 110 and the inverse conversion circuit 130 and connected in series with the rectifier circuit 110 and the inverse conversion circuit 130. The reactor 121 has an inductance L ([H]).

The capacitor 122 is provided between the rectifier circuit 110 and the inverse conversion circuit 130 and connected in parallel with the rectifier circuit 110 and the inverse conversion circuit 130. That is, an end of the capacitor 122 is connected to a positive output terminal of the rectifier circuit 110 through the reactor 121, and another end of the capacitor 122 is connected to a negative output terminal of the rectifier circuit 110. A direct current voltage (hereinafter also referred to as a direct current link voltage Vdc ([V])) caused at the ends of the capacitor 122 is connected to an input node of the inverse conversion circuit 130.

Here, the capacitor 122 to be employed is one that does not have a function of smoothing pulses of a waveform of a voltage (voltage variations caused by the alternating current voltage Vac ([V])) rectified by the rectifier circuit 110. The capacitor 122 to be employed, however, is one having a function of smoothing switching noise from the inverse conversion circuit 130. As a result, a power factor can be improved through switching control of the inverse conversion circuit, for example, while suppressing the capacitance of the capacitor 122. It is to be noted that "does not have a function of smoothing pulses of a waveform of a voltage rectified by the rectifier circuit 110" herein means that 80% or more of a pulse component included in a waveform obtained by rectifying the alternating current voltage remains at the ends of the capacitor while the motor is being driven with a rated output.

As described above, since the capacitor 122 does not have a function of smoothing pulses of a waveform of a voltage rectified by the rectifier circuit 110, a capacitor having a low capacitance can be employed as the capacitor 122. Since a capacitance C ([F]) of the capacitor 122 is low, however, the direct current link voltage Vdc ([V]) output from the direct-current link unit 120 pulsates. When the alternating current power supply 102 is a three-phase alternating current power supply, for example, the direct current link voltage Vdc ([V]) pulsates at a frequency six times as high as a power supply frequency. The capacitor 122 is achieved by a capacitor other than an electrolytic capacitor, namely, for example, a film capacitor.

Furthermore, the present inventors have examined optimization of the capacitance C ([F]) of the capacitor 122 and gained the following knowledge. First, the present inventors have found a knowledge that fifth and seventh harmonics from the rectifier circuit 110 can be reduced by using a value of the capacitance C ([F]) of the capacitor 122 that satisfies a condition of a following expression (1) for the three-phase alternating current motor whose maximum power consumption Pmax ([W]) is 2 kW or larger.

$$C \leq 350 \times 10^{-6} \frac{P\max}{Vac^2} \quad (1)$$

The present inventors have also gained a knowledge that, when a value of the capacitance C ([F]) of the capacitor that satisfies a condition of a following expression (2) is used, the function of smoothing switching noise from the inverse conversion circuit 130 can be maintained even if the capacitor C ([F]) of the capacitor 122 is decreased. Furthermore, the present inventors have gained a knowledge that the capacitance of the reactor 121 can be suppressed with this capacitor 122.

$$100 \times 10^{-6} \frac{P\max}{Vac^2} \leq C \quad (2)$$

The inverse conversion circuit 130 inversely converts the voltage Vdc rectified by the rectifier circuit 110 into an alternating current voltage having a certain frequency on the basis of input gate control signals and applies the alternating current voltage to the motor 103. Here, the input node of the inverse conversion circuit 130 is connected in parallel with the capacitor 122 of the direct-current link unit 120. In addition, the inverse conversion circuit 130 switches an output of the direct-current link unit 120 to convert the output into a three-phase alternating current.

The inverse conversion circuit 130 includes six switching devices SW1 to SW6 in order to output the three-phase alternating current to the motor 103. More specifically, the inverse conversion circuit 130 includes three switching legs, each of which is obtained by connecting two switching devices in series with each other. In the switching legs, nodes between the switching devices SW1, SW3, and SW5 in an upper arm and the switching devices SW2, SW4, and SW6 in a lower arm are connected to coils of the motor 103 in corresponding phases (U, V, and W). Flyback diodes RD1 to RD6 are connected in antiparallel with the switching devices SW1 to SW6, respectively. By turning on and off the switching devices SW1 to SW6, the inverse conversion circuit 130 switches the direct-current link voltage Vdc input from the direct-current link unit 120 to convert the direct-current link voltage Vdc into a three-phase alternating current voltage and supplies the three-phase alternating current voltage to the motor 103. The turning on and off is performed by the control circuit 150. In addition, the switching devices SW1 to SW6 are achieved, for example, by insulated-gate bipolar transistors (IGBTs).

The control circuit 150 performs various types of control in the power conversion apparatus 105. More specifically, the power conversion apparatus 105 drives the motor 103 by controlling the turning on and off of the switching devices SW1 to SW6 of the inverse conversion circuit 130. At this time, the control circuit 150 outputs gate control signals for turning on or off the switching devices SW1 to SW6 of the inverse conversion circuit 130 such that currents in the different phases (U, V, and W) flowing through the motor 103 pulsate in synchronization with pulsation of the direct-current link voltage Vdc. The control circuit 150 generates the gate control signals using carriers having a carrier frequency fc ([Hz]).

(3) Characteristics (3-1)

As described above, the power conversion apparatus 105 according to the present embodiment uses a value of the capacitance C ([F]) of the capacitor 122 that satisfies the condition of expression (1) for a three-phase alternating current motor whose maximum power consumption Pmax ([W]) is 2 kW or larger. As a result, the fifth and seventh harmonics from the rectifier circuit 110 can be reduced. In addition, the capacitor 122 can be usually achieved by a film capacitor of 200 μF or less when the alternating current power supply 102 is within a range of 200 to 600 V. In this case, the power conversion apparatus 105 can make a current limiting circuit between the alternating current power supply 102 and a capacitor 122 unnecessary.

Figure 3:
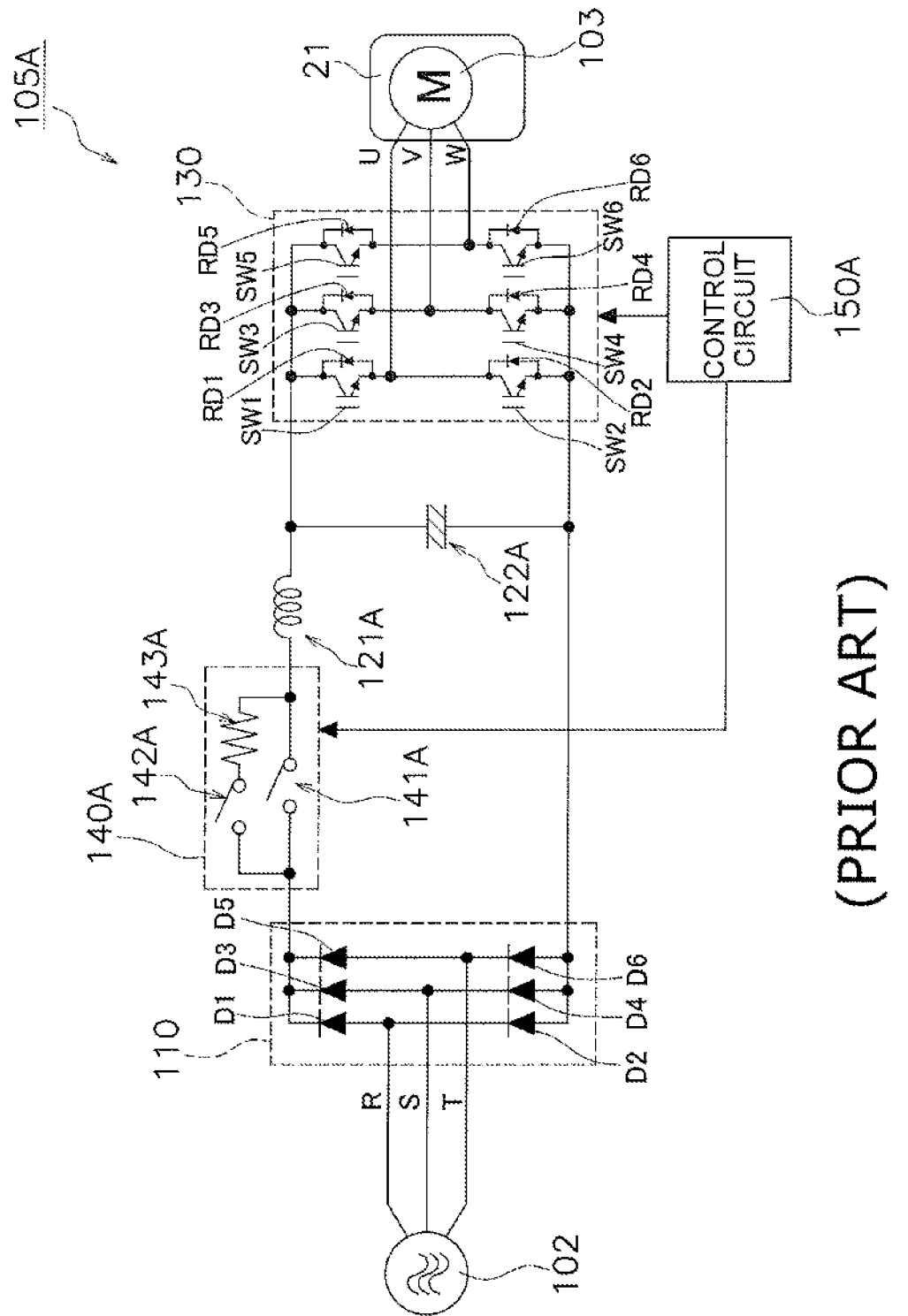
FIG. 3 is a schematic diagram illustrating the configuration of a conventional power conversion apparatus 105A.

That is, a conventional power conversion apparatus 105A is provided with a current limiting circuit 140A illustrated in FIG. 3. The current limiting circuit 140A is provided, for example, between the rectifier circuit 110 and a smoothing capacitor 122A. An electrolytic capacitor is used for the smoothing capacitor 122A. In this case, because the capacitance of the smoothing capacitor 122A is high, an inrush current might be caused in the power conversion apparatus 105A when the power conversion apparatus 105A is turned on. The current limiting circuit 140A is provided in order to avoid such an inrush current. More specifically, a control circuit 150A controls the current limiting circuit 140A in such a way as to turn off a main relay 141A and turn on a current limiting relay 142A when the power conversion apparatus 105A is turned on. As a result, current flows through a resistor 143A, and the smoothing capacitor 122A is charged while suppressing an inrush current. The control circuit 150A then controls, after charges are accumulated in the smoothing capacitor 122A, the current limiting circuit 140A in such a way as to turn off the current limiting relay 142A and turn on the main relay 141A. Occurrence of an inrush current in the power conversion apparatus 105A can thus be avoided.

In the power conversion apparatus 105 according to the present embodiment, the capacitor 122 is not an electrolytic capacitor, satisfies the condition of expression (1), and is achieved by a capacitor other than an electrolytic capacitor, such as a film capacitor. Occurrence of an inrush current, therefore, can be avoided, and the above-described current limiting circuit is unnecessary. As a result, the power conversion apparatus 105 achieves long lifetime and high reliability.

When a smoothing capacitor 122A having a high capacitance is used in the power conversion apparatus 105, for example, a high-frequency component of a power supply current might increase, the power factor might deteriorate, and an effective value current and a peak current might increase. In the power conversion apparatus 105 according to the present embodiment, on the other hand, a capacitor other than an electrolytic capacitor, such as a film capacitor, is used, and control of the motor 103 can be achieved without affecting reliability.

(3-2)

In addition, in the power conversion apparatus 105 according to the present embodiment, the value of the capacitance C ([F]) of the capacitor 122 satisfies the condition of expression (2). Even if the capacitance C ([F]) of the capacitor 122 is decreased, therefore, the function of smoothing switching noise from the inverse conversion circuit 130 can be maintained. Such a capacitor 122 can also suppress the capacitance of the reactor 121. Consequently, the power conversion apparatus 105 that offers a desirable overall cost balance can be provided.

(3-3)

In addition, the power conversion apparatus 105 according to the present embodiment can be used in a condition where the maximum power consumption Pmax ([W]) of the motor 103 is 2 kW or larger. The power conversion apparatus 105, therefore, is suitable for a product that requires a high-output motor. The power conversion apparatus 105 can also be used for an air conditioning apparatus 1 intended for a building.

(3-4)

In addition, a power conversion apparatus 105 having one of the above characteristics is mounted on the air conditioning apparatus 1 according to the present embodiment. The air conditioning apparatus 1, therefore, can be improved in terms of reliability and reduced in size, weight, and cost.

In addition, the air conditioning apparatus 1 according to the present embodiment is configured to perform only the cooling operation. Consequently, a compact air conditioning apparatus can be provided.

Figure 4:
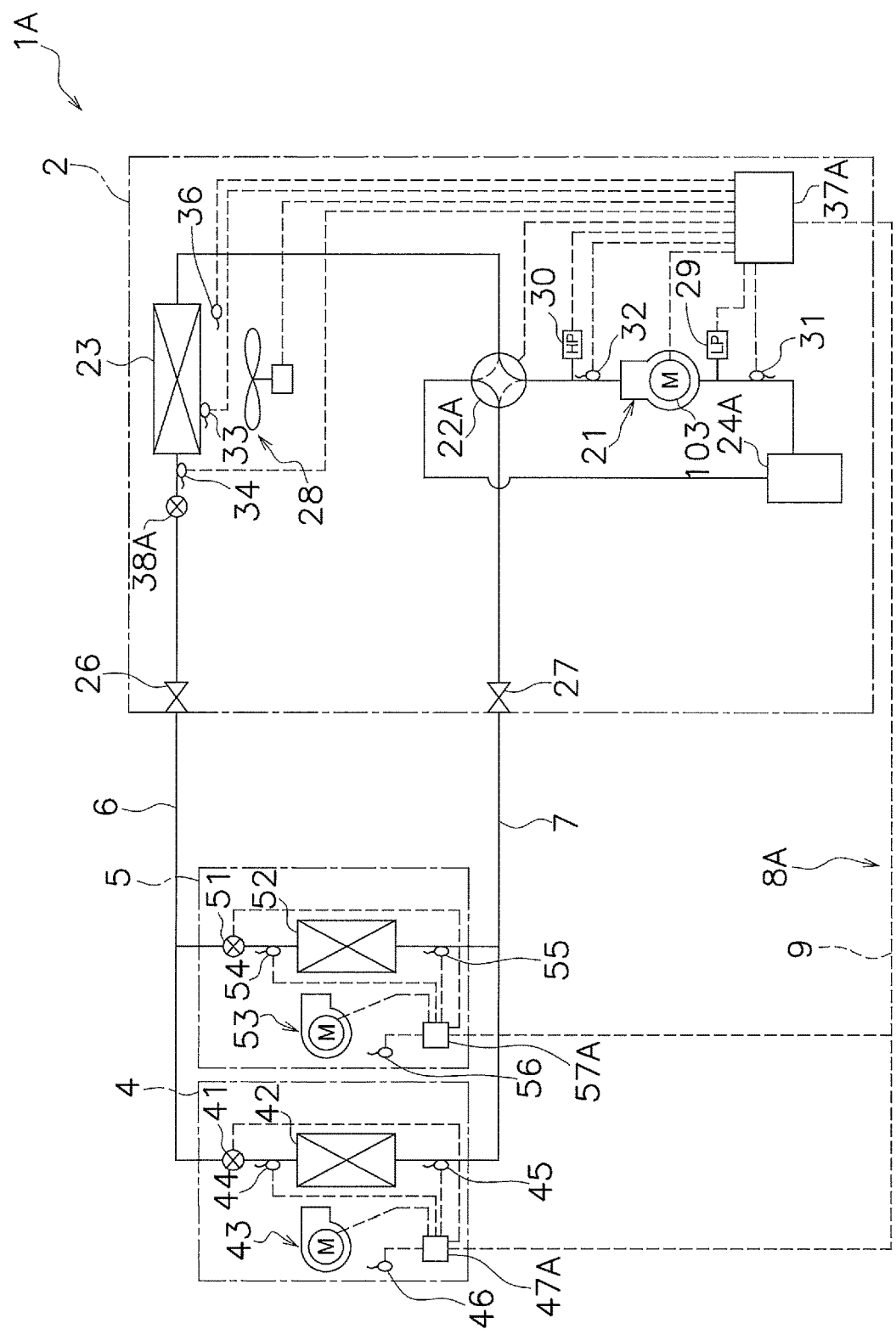
FIG. 4 is a schematic diagram illustrating the configuration of an air conditioning apparatus 1A for comparison.

That is, when an air conditioning apparatus performs a heating operation or the like as well as the cooling operation, a refrigerant circuit illustrated in FIG. 4 needs to be provided. In other words, as illustrated in FIG. 4, such an air conditioning apparatus 1A needs to further include a four-way switching valve 22A, an accumulator 24A, an expansion valve 38A, and the like. The four-way switching valve 22A is used to change a direction in which a refrigerant flows. The accumulator 24A is used to absorb a difference in the amount of refrigerant between the cooling operation and the heating operation. The expansion valve 38A is used to adjust the amount of refrigerant flowing in the outdoor unit 2 in the heating operation.

Compared to the air conditioning apparatus 1A, the air conditioning apparatus 1 according to the present embodiment can be configured compactly without mounting these components.

(4) Modifications (4-1) Modification 1A

In the above embodiment, values of the inductance L ([H]) of the reactor 121 and the capacitance C ([F]) of the capacitor 122 that further satisfy a condition of a following expression (3) may be used. Here, a value of a constant a is 4.3. As a result of the examination conducted by the present inventors, it has been found that an excessive current can be prevented from flowing into the rectifier circuit 110 when this condition is satisfied.

$$a \cdot C \cdot \sqrt{\frac{C}{L}} \frac{Vac^3}{P_{max}} \leq \alpha_m \quad (3)$$

(4-2) Modification 1B

In addition, in the above embodiment, values of the inductance L ([H]) of the reactor 121 and the capacitance C ([F]) of the capacitor 122 that further satisfy a following expression (4) may be used. As a result of the examination conducted by the present inventors, it has been found that switching noise caused by the inverse conversion circuit 130 can be absorbed when this condition is satisfied. Here, fc ([Hz]) denotes a carrier frequency, and a value of a constant K is ¼.

$$\frac{1}{2\pi\sqrt{LC}} \leq K \cdot fc \qquad (4)$$

(4-3) Modification 1C

Figure 5:
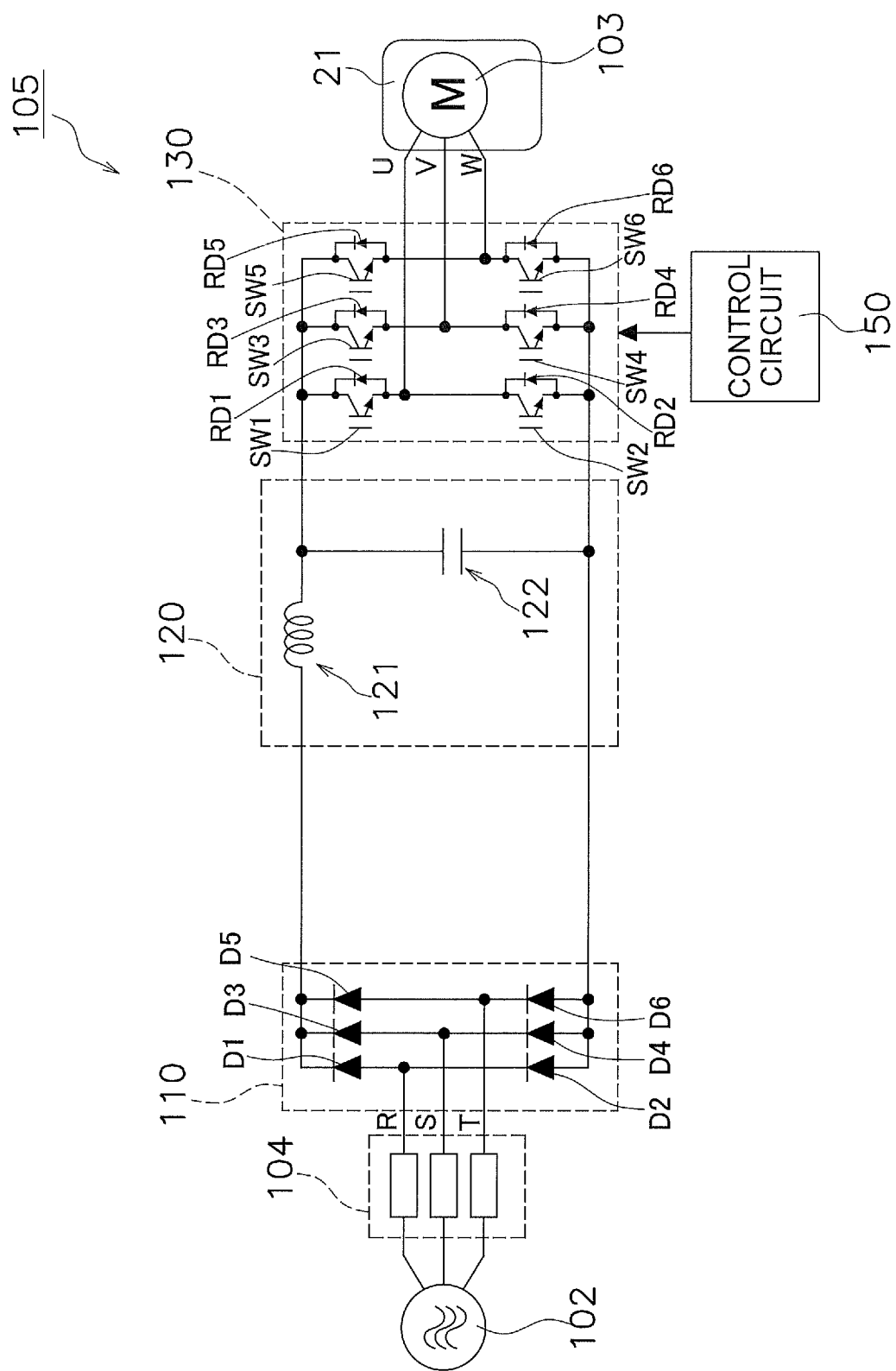
FIG. 5 is a schematic diagram illustrating the configuration of a power conversion apparatus 105 according to modification 1C.

As illustrated in FIG. 5, the power conversion apparatus 105 according to the present embodiment may further include a fuse 104. In this case, an excessive current can be prevented from flowing into the components of the power conversion apparatus 105.

That is, in the present embodiment, a relay (e.g., the main relay 141A) need not be provided between the alternating current power supply 102 and the motor 103. When the fuse 104 is not provided, therefore, a power supply system for the motor 103 cannot be separated from the alternating current power supply 102. Since the power conversion apparatus 105 according to modification 1C includes the fuse 104 in such a case, the power supply system for the motor 103 can be separated from the alternating current power supply 102 at a time of an abnormality, which increases safety. In other words, even though the main relay 141A is omitted, the power conversion apparatus 105 according to modification 1C can be reduced in size while maintaining safety.

(4-4) Modification 1D

Figure 6:
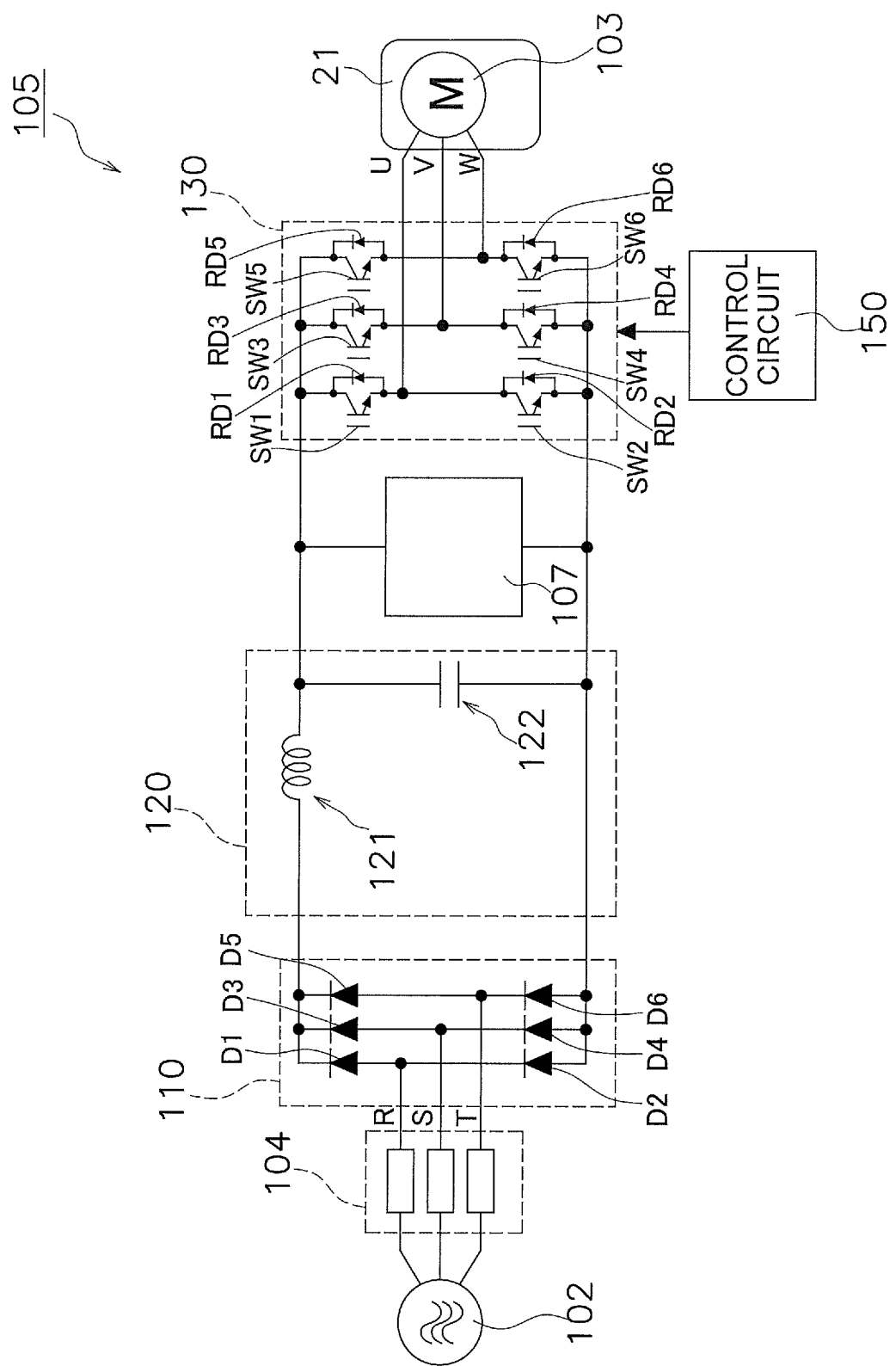
FIG. 6 is a schematic diagram illustrating the configuration of a power conversion apparatus 105 according to modification 1D.

As illustrated in FIG. 6, the power conversion apparatus 105 according to the present embodiment may further include a surge voltage clamping circuit 107. The surge voltage clamping circuit 107 absorbs regenerative power of the motor 103. In addition, since the surge voltage clamping circuit 107 absorbs switching noise, the capacitance C of the capacitor 122 can be further reduced. As a result, the power conversion apparatus 105 can be reduced in size while maintaining safety.

(4-5) Modification 1E

Although an example in which the air conditioning apparatus 1 performs only the cooling operation has been described in the above embodiment, the air conditioning apparatus 1 according to the present embodiment is not limited to this. That is, the air conditioning apparatus may perform the heating operation or the like as well as the cooling operation. In this case, the air conditioning apparatus further includes the four-way switching valve 22A, the accumulator 24A, the expansion valve 38A, and the like as illustrated in FIG. 4. Switching between the cooling operation and the heating operation is performed by a control unit 8A, which includes an outdoor-side control unit 37A and an indoor-side control unit 47A.

(4-6) Modification 1F

Although a current limiting circuit between the alternating current power supply 102 and the capacitor 122 is unnecessary in the above embodiment, the power conversion apparatus 105 according to the present disclosure is not limited to this. The power conversion apparatus 105 does not eliminate a mode in which a relay and/or a current limiting circuit is provided between the alternating current power supply 102 and the capacitor 122.

Second Embodiment (5) Motor Driving Apparatus (5-1)

A motor driving apparatus according to a second embodiment includes a power conversion apparatus 105S. In the following description, the same components as those described above will be given the same reference numerals, and redundant description thereof is omitted. A suffix of S might be given in the present embodiment for the purpose of distinction from other embodiments.

In the present embodiment, an outdoor-side control unit 37S of the outdoor unit 2 further includes a discharge pressure abnormality detection unit 37L. The discharge pressure abnormality detection unit 37L outputs an "abnormality signal" to the power conversion apparatus 105S if the discharge pressure of the compressor 21 becomes equal to or higher than a threshold.

Figure 7:
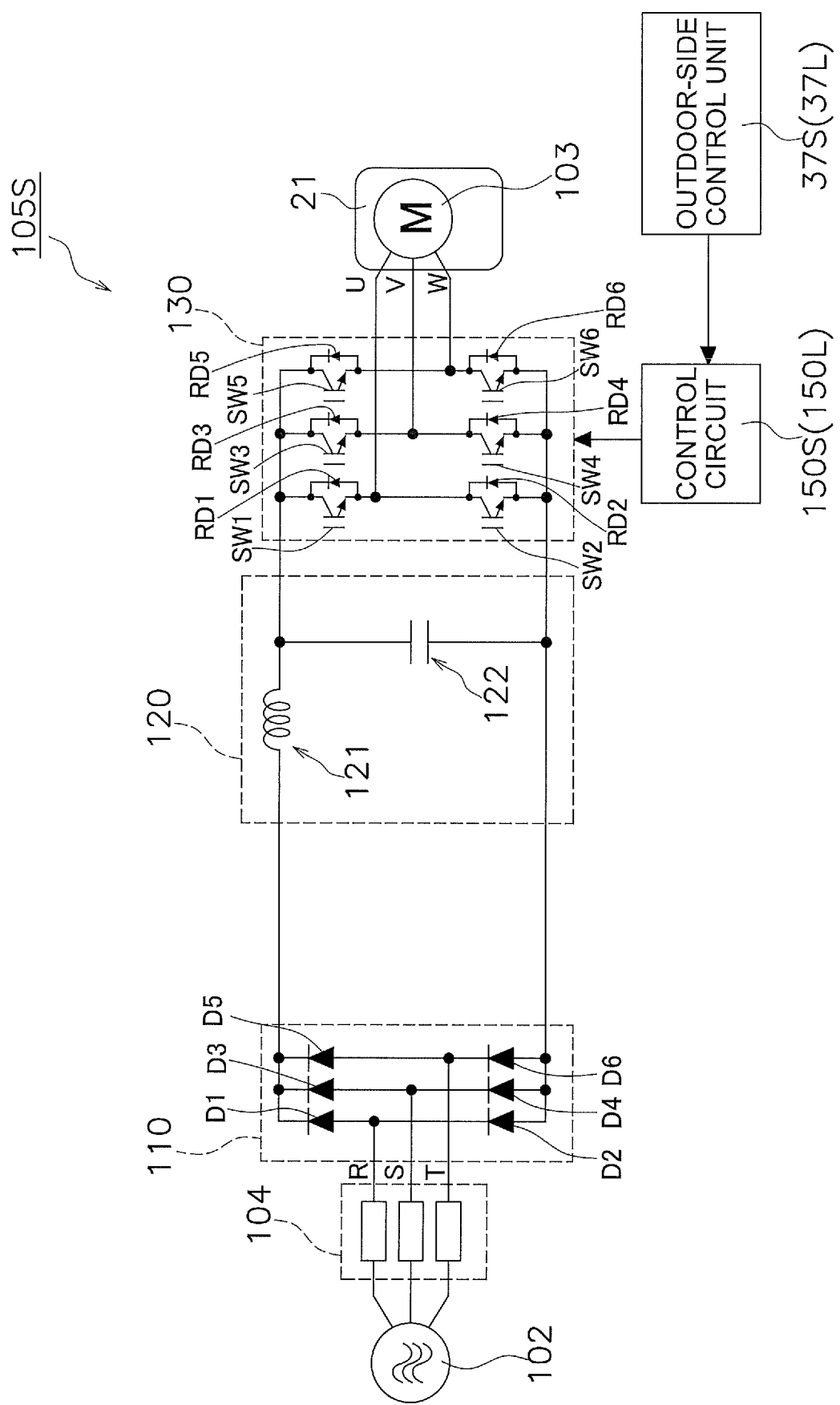
FIG. 7 is a schematic diagram illustrating the configuration of a power conversion apparatus 105S according to a second embodiment.

In addition, as illustrated in FIG. 7, the power conversion apparatus 105S according to the present embodiment includes the rectifier circuit 110, the inverse conversion circuit 130, the capacitor 122, and a control circuit 150S. The control circuit 150S includes an abnormal stop unit 150L in addition to the components and the functions of the control circuit 150 according to the first embodiment. If the abnormal stop unit 150L receives an abnormality signal indicating an abnormality in the discharge pressure of the compressor 21, the abnormal stop unit 150L stops inputting gate control signals to the inverse conversion circuit 130 regardless of presence or absence of a relay between the alternating current power supply 102 and the capacitor 122.

(5-2)

Figure 8:
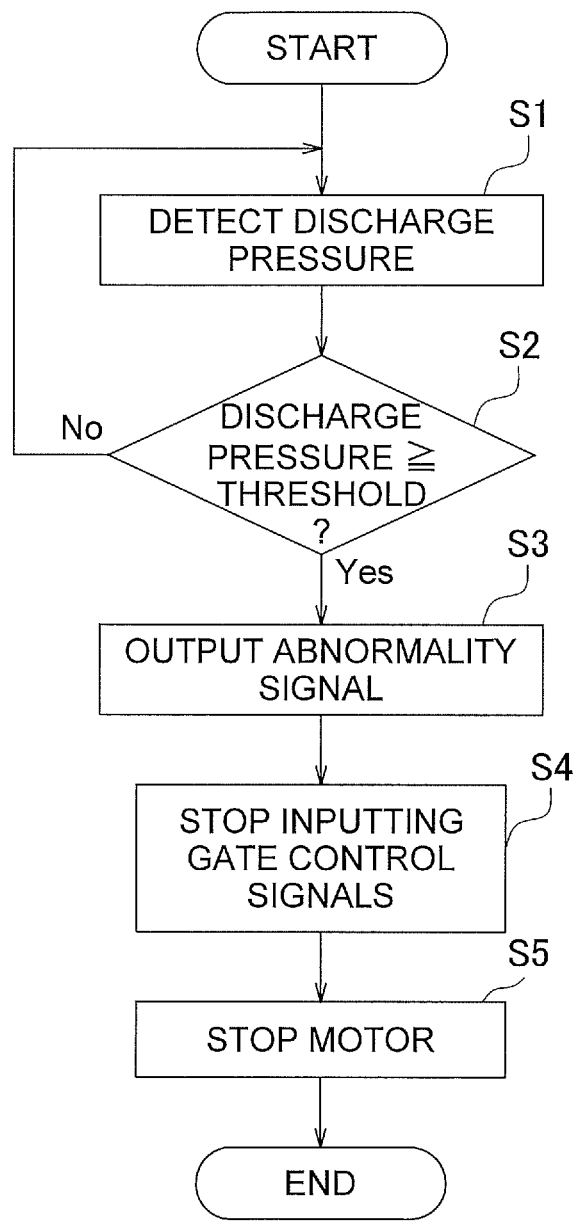
FIG. 8 is a flowchart illustrating the operation of the power conversion apparatus 105S according to the second embodiment.

FIG. 8 is a flowchart illustrating the operation of the power conversion apparatus 105S according to the present embodiment.

The discharge pressure sensor 30 detects the discharge pressure of the compressor 21 as necessary (S1). Information regarding the discharge pressure is transmitted to the outdoor-side control unit 37S as necessary.

The outdoor-side control unit 37S (discharge pressure abnormality detection unit 37L) determines as necessary whether the discharge pressure of the compressor 21 is equal to or higher than the threshold. If determining that the discharge pressure has become equal to or higher than the threshold (S2—Yes), the outdoor-side control unit 37 (discharge pressure abnormality detection unit 37L) outputs an abnormality signal to the power conversion apparatus 105S (S3).

If the power conversion apparatus 105S receives the abnormality signal from the discharge pressure abnormality detection unit 37L, the control circuit 150 (abnormal stop unit 150L) stops inputting gate control signals to the inverse conversion circuit 130 (S4).

As a result, the switching devices SW1 to SW6 of the inverse conversion circuit 130 are stopped, and the motor 103 stops (S5).

(6) Characteristics (6-1)

As described above, if the control circuit 150S according to the present embodiment receives an abnormality signal indicating an abnormality in the discharge pressure of the compressor 21, the power conversion apparatus 105S stops inputting control signals to the inverse conversion circuit 130 regardless of presence or absence of a relay between the alternating current power supply 102 and the capacitor 122. This configuration makes it possible to provide the power conversion apparatus 105S capable of achieving reduction in size while maintaining reliability.

That is, when there is no relay between the alternating current power supply 102 and the capacitor 122, the power supply system for the motor 103 cannot be separated from the alternating current power supply 102. Even if the discharge pressure of the compressor 21 exhibits an abnormality value, therefore, an emergency stop or the like employing a relay might not be performed. In this case, too, the power conversion apparatus 105S according to the present embodiment stops inputting control signals to the inverse conversion circuit 130 at a time of an abnormality, which increases safety. In other words, the power conversion apparatus 105S according to the present embodiment can achieve reduction in size by omitting a relay while maintaining safety.

(6-2)

In addition, the power conversion apparatus 105S according to the present embodiment may be one whose capacitor 122 has a capacitance C ([F]) that satisfies the condition of expression (1). The capacitor 122 is achieved by a capacitor other than an electrolytic capacitor, such as a film capacitor. As a result, the fifth and seventh harmonics can be reduced.

(6-3)

In addition, the power conversion apparatus 105S according to the present embodiment may be one whose capacitor 122 has a capacitance C ([F]) that satisfies the condition of expression (2). Such a capacitor 122 can maintain the function of smoothing switching noise from the inverse conversion circuit 130 even if the capacitance C ([F]) of the capacitor 122 is decreased. Such a capacitor 122 can also suppress the capacitance of the reactor 121. Consequently, the power conversion apparatus 105S that offers a desirable overall cost balance can be provided.

(6-4)

In addition, the power conversion apparatus 105S according to the present embodiment can be used in a condition where the maximum power consumption Pmax ([W]) of the motor 103 is 2 kW or larger. The power conversion apparatus 105, therefore, is suitable for a product that requires a high-output motor. For example, the power conversion apparatus 105 is suitable for use in an air conditioning apparatus capable of achieving air conditioning in the entirety of a building.

(6-5)

In addition, a power conversion apparatus 105S having one of the above characteristics is mounted on the air conditioning apparatus 1 according to the present embodiment. The air conditioning apparatus 1, therefore, can be improved in terms of reliability and reduced in size, weight, and cost.

In addition, the air conditioning apparatus 1 according to the present embodiment is configured to perform only the cooling operation. Consequently, a compact air conditioning apparatus can be provided. Details are the same as in the characteristic (3-4).

(7) Modifications (7-1) Modification 2A

In the above embodiment, values of the inductance L ([H]) of the reactor 121 and the capacitance C ([F]) of the capacitor 122 that further satisfy the condition of expression (3) may be used. Details are the same as in modification 1A.

(7-2) Modification 2B

In addition, in the above embodiment, values of the inductance L ([H]) of the reactor 121 and the capacitance C ([F]) of the capacitor 122 that further satisfy the condition of expression (4) may be used. Details are the same as in modification 2B.

(7-3) Modification 2C

The power conversion apparatus 105S according to the present embodiment may further include a fuse. In this case, an excessive current can be prevented from flowing into the components of the power conversion apparatus 105S. Details are the same as in modification 1C.

(7-4) Modification 2D

The power conversion apparatus 105S according to the present embodiment may further include a surge voltage clamping circuit 107. Details are the same as in modification 1D.

(7-5) Modification 2E

Although an example in which the air conditioning apparatus 1 performs only the cooling operation has been described in the above embodiment, the air conditioning apparatus 1 according to the present embodiment is not limited to this. That is, the air conditioning apparatus 1 may perform the heating operation or the like as well as the cooling operation. Details are the same as in modification 1E.

(7-6) Modification 2F

Although a current limiting circuit between the alternating current power supply 102 and the capacitor 122 is unnecessary in the above embodiment, the power conversion apparatus 105 according to the present disclosure is not limited to this. Details are the same as in modification 1F.

Other Embodiments

Although embodiments have been described above, it should be understood that various modifications can be made to the modes and the details without deviating from the spirit and the scope of the claims.

That is, the present disclosure is not simply limited to each of the above embodiments. The present disclosure can be implemented in practice while modifying the components without deviating from the gist thereof. In addition, the present disclosure can produce various disclosures by appropriately combining together a plurality of components disclosed in each of the above embodiments. For example, some of the components described in the embodiments may be omitted. Furthermore, components from different embodiments may be appropriately combined together.

REFERENCE SIGNS LIST 1 air conditioning apparatus
8 control unit
21 compressor
22A four-way switching valve
24A accumulator
37 outdoor-side control unit
37A outdoor-side control unit
38A expansion valve
47 indoor-side control unit
47A indoor-side control unit
102 alternating current power supply (three-phase alternating current power supply)
103 motor
104 fuse
105 power conversion apparatus
105A power conversion apparatus
105S power conversion apparatus
107 surge voltage clamping circuit 110 rectifier circuit
120 direct-current link unit
121 reactor
122 capacitor
130 inverse conversion circuit
140A current limiting circuit
141A main relay
142A current limiting relay
143A resistor
150 control circuit
150A control circuit
150S control circuit
150L abnormal stop unit
D1 to D6 diode
SW1 to SW6 switching device

CITATION LIST

Patent Literature

PTL 1 Japanese Unexamined Patent Application Publication No. 56-49693

The invention claimed is:

1. A power conversion apparatus comprising:
a rectifier circuit that rectifies alternating current power of a three-phase alternating current power supply;
an inverse conversion circuit that inversely converts a voltage rectified by the rectifier circuit into an alternating current voltage having a certain frequency and that applies the alternating current voltage to a motor whose maximum power consumption Pmax is 2 kW or larger; and
a capacitor that is provided between the rectifier circuit and the inverse conversion circuit and that has a capacitance C which satisfies a condition of a following first expression in relation to an alternating current voltage Vac of the three-phase alternating current power supply and the maximum power consumption Pmax $$C \le 350 \times 10^{-6} \frac{Pmax}{Vac^2}. \quad (1)$$

wherein the capacitor is configured to satisfy the condition of the first expression to enable the power conversion apparatus to reduce fifth and seventh harmonics from the rectifier circuit.

2. The power conversion apparatus according to claim 1, wherein the capacitor has a capacitance C that satisfies a condition of a following second expression $$100 \times 10^{-6} \frac{Pmax}{Vac^2} \le C. \quad (2)$$

wherein the capacitor is configured to satisfy the condition of the second expression to enable the power conversion apparatus to maintain a function of smoothing switching noise from the inverse conversion circuit during a decrease of the capacitance C of the capacitor.

3. The power conversion apparatus according to claim 2, wherein a capacitance of the capacitor is equal to or lower than 200 µF.

4. The power conversion apparatus according to claim 2, wherein the capacitor is a capacitor other than an electrolytic capacitor.

5. The power conversion apparatus according to claim 2, wherein the capacitor is a film capacitor.

6. The power conversion apparatus according to claim 2, wherein a relay is not provided between the three-phase alternating current power supply and the capacitor.

7. The power conversion apparatus according to claim 2, further comprising:
a relay between the three-phase alternating current power supply and the capacitor.

8. The power conversion apparatus according to claim 1, wherein a capacitance of the capacitor is equal to or lower than 200 µF.

9. The power conversion apparatus according to claim 8, wherein the capacitor is a capacitor other than an electrolytic capacitor.

10. The power conversion apparatus according to claim 8, wherein the capacitor is a film capacitor.

11. The power conversion apparatus according to claim 8, wherein a relay is not provided between the three-phase alternating current power supply and the capacitor.

12. The power conversion apparatus according to claim 1, wherein the capacitor is a capacitor other than an electrolytic capacitor.

13. The power conversion apparatus according to claim 12, wherein the capacitor is a film capacitor.

14. The power conversion apparatus according to claim 12, wherein a relay is not provided between the three-phase alternating current power supply and the capacitor.

15. The power conversion apparatus according to claim 1, wherein the capacitor is a film capacitor.

16. The power conversion apparatus according to claim 15, wherein a relay is not provided between the three-phase alternating current power supply and the capacitor.

17. The power conversion apparatus according to claim 1, wherein a relay is not provided between the three-phase alternating current power supply and the capacitor.

18. The power conversion apparatus according to claim 1, further comprising:
a relay between the three-phase alternating current power supply and the capacitor.

19. The power conversion apparatus according to claim 1, wherein the motor is mounted on a compressor of an air conditioning apparatus.

20. An air conditioning apparatus on which the power conversion apparatus according to claim 1 is mounted.

* * * * *